Patented May 18, 1948

2,441,867

UNITED STATES PATENT OFFICE 2,441,867

METHODS OF PRODUCING 2-(ALPHA-NAPHTHYLMETHYL)-IMIDAZOLINE

Sven Carlsson, Abrahamsberg, Sweden, assignor to Aktiebolaget Recip, Stockholm, Sweden, a company of Sweden No Drawing. Application October 26, 1946, Serial No. 706,079. In Sweden November 19, 1943

Section 1, Public Law 690, August 8, 1946
Patent expires November 19, 1963

5 Claims. (Cl. 260—309.6)

The present invention relates to a new method of producing 2-(alpha-naphthylmethyl)-imidazoline, a compound which is of importance because of its valuable therapeutic qualities, especially as a vessel contracting and mucous membrane deflating agent.

Hitherto imidazolines substituted in the 2-position by aryl or aralkyl radicals have been manufactured either in such a way that imidoesters of aliphatic acids substituted by aromatic radicals are first produced and then reacted with 1,2-diamines, or the synthesis has been carried out by immediately reacting aliphatic acids substituted by aromatic radicals with 1,2-diamines in the presence of mineral acids in a substantially molar ratio. The first named method has the drawback that it is necessary to produce the imidoesters from the acids in question in a first reaction stage, the whole process thus comprising two stages. The synthesis of the imidazolines produced by the immediate reaction of aliphatic acids substituted by aromatic radicals with 1,2-diamines in the presence of mineral acids in a substantially molar ratio has the drawback that the extraction of the imidazolines from the reaction mixture forms a comparatively complex operation.

The method according to the invention is distinguished from those known methods by a greater simplicity.

According to the invention alpha-naphthylacetic acid is heated with ethylenediamine in the absence of mineral acids. By this reaction there is formed at first ethylenediamine-alpha-naphthylacetate which, if an excess of alpha-naphthylacetic acid is used, is a neutral salt in which each molecule of ethylenediamine is combined with 2 molecules of alpha-naphthylacetic acid. By splitting off water this ethylenediamine salt is converted into di-(alpha-naphthylacetyl)-ethylenediamine. This compound in its turn is rearranged into 2-(alpha-naphthylmethyl)-imidazoline-alpha-naphthylacetate by the continued heating to 220° C.

It is especially advantageous to carry out the reaction under constantly passing a current of ethylenediamine over the reaction mixture. Hereby the reaction product is prevented from being oxidized by air and the 2-(alpha-naphthylmethyl)-imidazoline formed by the reaction is liberated from its alpha-naphthylacetate by the excess of ethylenediamine. Simultaneously new amounts of ethylenediamine-alpha-naphthylacetate and, in a further reaction phase, new amounts of di-(alpha-naphthylacetyl)-ethylenediamine are formed, the latter product yielding additional amounts of 2-(alpha-naphthyl-methyl)-imidazoline.

The 2-(alpha-naphthylmethyl)-imidazoline formed by the reaction according to the invention can be removed from the reaction mixture by vacuum distillation since it is not bound by any acid. This simple way of removing the reaction products forms a considerable advantage of the process according to the invention because any complicated recovering operations become dispensable which in contrast thereto are necessary in the known synthesis of this compound from the same components in the presence of molar amounts of a mineral acid.

The reaction proceeds according to the following formulae:

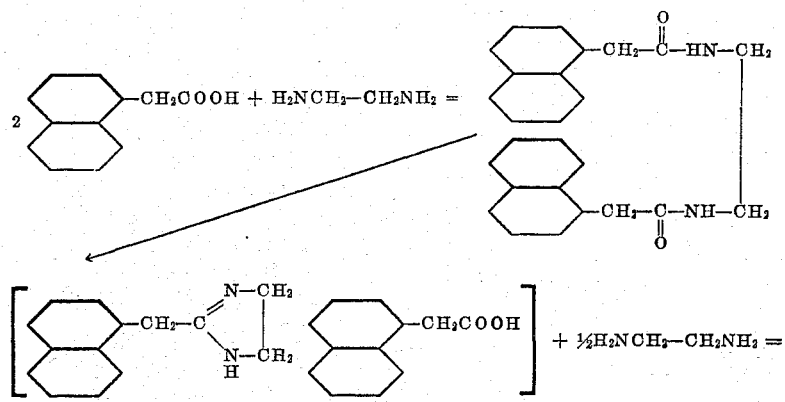

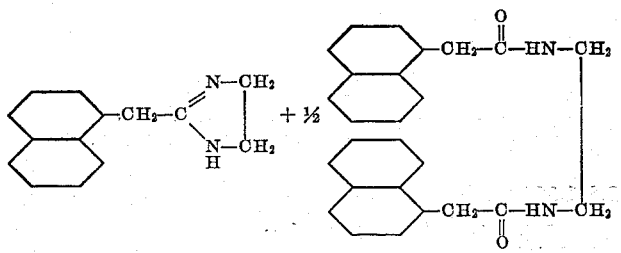

The following example may illustrate the invention.

372 g. alpha-naphthylacetic acid are neutralized with 78 g. ethylenediamine-hydrate whereupon the mixture is heated during one hour to 220° C. under simultaneously passing over a weak current of anhydrous ethylenediamine (about 120 g.); the reaction mixture is kept at this temperature for two hours. The formed 2-(alpha-naphthylmethyl)-imidazoline is removed by vacuum distillation (10 mm. Hg pressure, temperature 230° C.) Either the passing of a current of ethylenediamine is continued during the distillation or after the distillation 60 g. ethylenediamine-hydrate are added in small portions to the still molten residue of the distillation, the temperature being maintained at 220° C. during about one hour; then a renewed distillation takes place. The heating of the reaction mixture and the distillation are repeated until the yield of 2-(alpha-naphthylmethyl)-imidazoline amounts to 300 g. After fractionating the reaction product by repeated vacuum distillation the melting point of the 2-(alpha-naphthylmethyl)-imidazoline is 119° C. From said imidazoline the hydrochloride with a melting point of 253° C. can be obtained.

What I claim is:

1. A method of producing 2-(alpha-naphthylmethyl)-imidazoline, comprising heating a reaction medium containing as the sole reacting ingredients and reaction influencing ingredients alpha-naphthylacetic acid and ethylene-diamine, to substantially 220° C.

2. A method of producing 2-(alpha-naphthylmethyl)-imidazoline according to claim 1, in which two mols of alpha-naphthylacetic acid are mixed with one mol of ethylenediamine hydrate and the mixture is caused to react by heating it to substantially 220° for at least two hours, a current of ethylenediamine being passed over the reaction mixture.

3. A method of producing 2-(alpha-naphthylmethyl)-imidazoline according to claim 1, in which two mols of alpha-naphthylacetic acid are mixed with one mol of ethylenediamine hydrate and the mixture is caused to react by heating it to substantially 220° for at least two hours, a current of ethylenediamine being passed over the reaction mixture, whereupon 2-(alpha-naphthylmethyl)-imidazoline formed by the reaction is removed by vacuum distillation.

4. A method of producing 2-(alpha-naphthylmethyl)-imidazoline according to claim 1, in which alpha-naphthylacetic acid in a quantity exceeding the stoichiometric ratio of 2 mols is mixed with 1 mol of ethylenediamine-hydrate and the mixture is then heated to substantially 220° C. for at least two hours, a current of ethylenediamine being passed over the reaction mixture.

5. A method of producing 2-(alpha-naphthylmethyl)-imidazoline according to claim 1, in which alpha-naphthylacetic acid in a quantity exceeding the stoichiometric ratio of 2 mols is mixed with 1 mol of ethylenediamine-hydrate and the mixture is then heated to substantially 220° C. for at least two hours, a current of ethylenediamine being passed over the reaction mixture, whereupon 2-(alpha-naphthylmethyl)-imidazoline formed by the reaction is removed by vacuum distillation.

SVEN CARLSSON.

REFERENCES CITED

The following references are of record in the file of this patent:

UNITED STATES PATENTS

| Number | Name | Date |
| --- | --- | --- |
| 2,155,877 | Waldmann | Apr. 25, 1939 |

FOREIGN PATENTS

| Number | Country | Date |
| --- | --- | --- |
| 78,020 | Germany | Apr. 8, 1894 |
| 207,999 | Switzerland | May 7, 1937 |